Dec. 8, 3,545,845
...STEM
WITH LONG BACK FOCAL LENGTH
Filed July 10, 1968
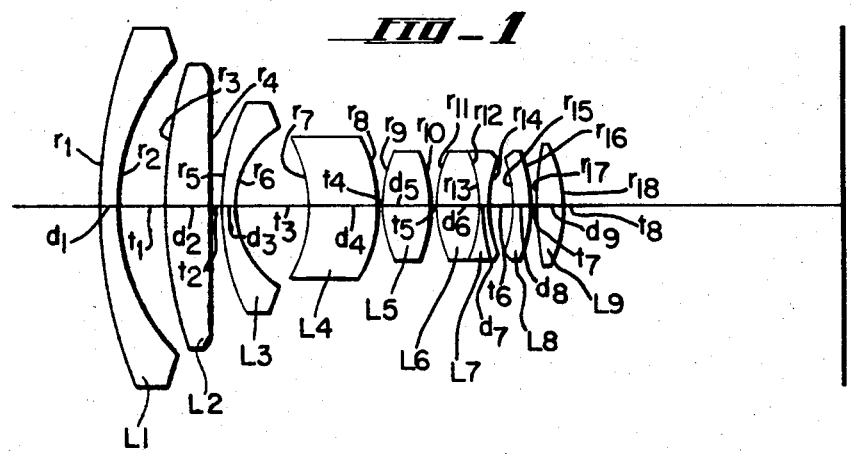
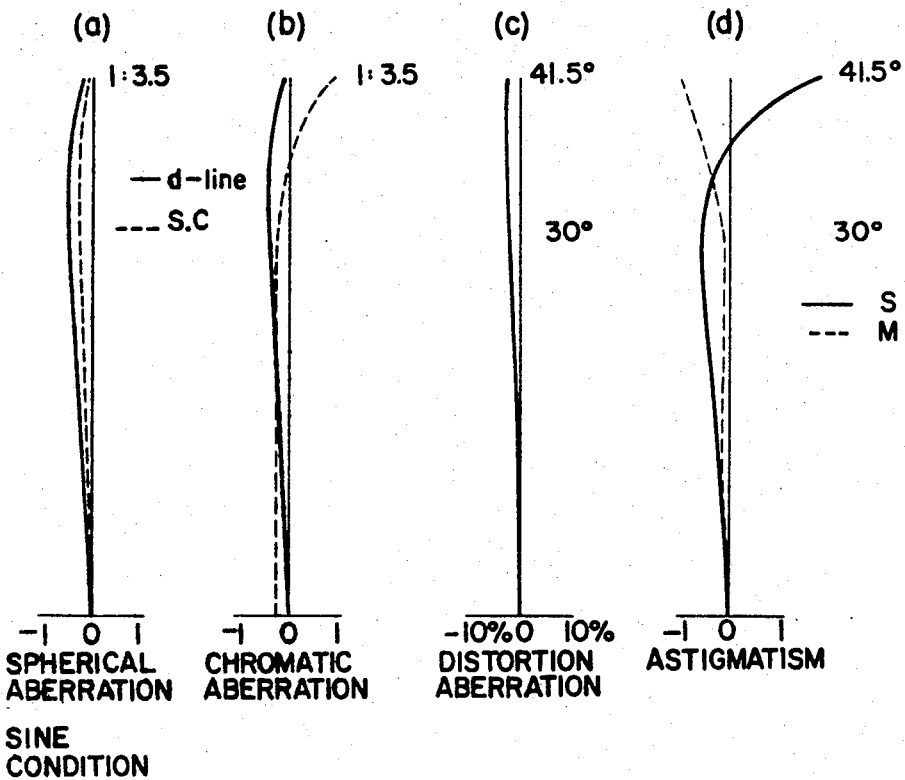
INVENTOR
YASUO TAKAHASHI
BY *Stanley Wolder*
ATTORNEY ized Dec. 8, 1970

United States Patent Office 3,545,845
Patented Dec. 8, 1970

3,545,845
COMPACT WIDE ANGLE OBJECTIVE LENS SYSTEM WITH LONG BACK FOCAL LENGTH
Yasuo Takahashi, Tokyo-to, Japan, assignor to Asahi Kogaku Kogyo Kabushiki Kaisha, Tokyo-to, Japan, a corporation of Japan
Filed July 10, 1968, Ser. No. 743,854
Claims priority, application Japan, July 24, 1967, 42/47,511
Int. Cl. G02b $1/00, 9/00$
U.S. Cl. 350—214         1 Claim

ABSTRACT OF THE DISCLOSURE

A compact long rear focus wide angle lens system includes a negative meniscus first and third lenses, positive meniscus eighth lens, negative seventh lens and positive second, fifth, sixth and ninth lenses, the sixth and seventh lenses being cemented to form a unitary group, the lens system satisfying the following conditions.

$\infty \geq |r_7| > 0.8F$, $r_7 < 0$
$F/0.5 > |F_{1.2.3}| > F$, $F_{1.2.3} < 0$
$|F_{1.2.3.4.5}| > F/0.1$
$0.7F > r_{14} > 0.55F$
$F > |r_{16}| > 0.5F$, $r_{16} < 0$
$n_7 - n_6 > 0.1$
$1.5F > |r_{12}| > 0.9F$, $r_{12} < 0$
$0.7F > k > 0.45F$ wherein F is the resultant focal length of the lens system; $F_{1.2...i}$ is the resultant focal length of the first to the $i$-th lens; $r_j$ is the radius of curvature of the $j$-th lens face; $n_i$ is the index of refraction of the $i$-th lens; and $k$ is the axial distance between the seventh and tenth lens faces.

BACKGROUND OF THE INVENTION

The present invention relates generally to improvements in optical systems and it relates more particularly to an improved camera wide angle objective system.

The wide angle objective lens system particularly a camera wide angle lens system having a long back focal length, represents a compromise in design. The conventional wide angle object lens of long back focus is either a large bulky device or of poor optical quality or both and otherwise leaves much to be desired thereby greatly limiting its use and application.

SUMMARY OF THE INVENTION

It is therefore a principal object of the present invention to provide an improved camera objective lens system.

Another object of the present invention is to provide an improved wide angle objective lens system.

Still another object of the present invention is to provide and improved wide angle lens system of long back focal length.

A further object of the present invention is to provide an improved highly corrected, compact, wide angle objective lens system of long back focal length.

The above and other objects of the present invention will become apparent from a reading of the following description taken in conjunction with the accompanying drawing which illustrates a preferred embodiment thereof.

In a sense the present invention contemplates the provision of a lens system comprising nine lenses and satisfying the following conditions:

(1) $\infty \geq |r_7| > 0.8F$, $r_7 < 0$
(2) $F/0.5 > |F_{1.2.3}| > F$, $F_{1.2.3} < 0$
(3) $|F_{1.2.3.4.5}| > F/0.1$
(4) $0.7F > r_{14} > 0.55F$
(5) $F > |r_{16}| > 0.5F$, $r_{16} < 0$
(6) $n_7 - n_6 > 0.1$
(7) $1.5F > |r_{12}| > 0.9F$, $r_{12} < 0$
(8) $0.7F > k > 0.45F$ wherein the lenses are herein successively designated as 1 to 9, the lens faces are herein successively designated as 1 to 18 and F is the resultant focal length of the lens system; $F_{1.2...i}$ is the resultant focal length of the first to the $i$-th lens; $r_j$ is the radius of curvature of the $j$-th lens face; $n_i$ is the index of refraction of the $i$-th lens; and $k$ is the axial distance between the seventh and tenth lens faces.

Advantageously the first lens is a negative meniscus lens with a convex front face, the second lens is a positive lens, the third lens is a negative meniscus with a convex front face, the fourth lens is very thick low power lens, thicker and of smaller power than any of the other lenses of the system, the fifth lens is a double convex positive lens, the sixth and seventh lenses are positive and negative respectively with confronting mating complementing faces of smaller curvature than the opposite faces of the respective lenses and cemented together to form a unitary group, the eighth lens is a positive meniscus lens with a concave front face and the ninth lens is positive.

In the parameters of the lens system set forth above, conditions (1) and (8) function to reduce the size of the lens system and increase the back focal length thereof. A decrease in the absolute value of the radius of curvature $r_7$ of the seventh lens face, the fourth lens front face, below 0.8F results in very high coma aberration of a ray of large angle of incidence and large height of point of incidence which is increasingly difficult to compensate. On the other hand, a positive value for $r_7$, that is the fourth lens front face being convex, would adversely effect the back focal length. The condition (2) in association with the conditions (3) and (8) is essential for achieving the desired long back focal length. When $d_3$, the axial distance between the third lens rear face and the fourth lens front face, is minimized for compactness, the aforesaid three conditions function to achieve a ratio of the lens system back focal length to F, the resultant focal length of the lens system, of about 1.5:1. The condition (8) is essential for overall compactness of the lens system, importantly, the diameter of the first lens may be greatly reduced by making $t_4$ and $t_5$ the thicknesses of the fourth and fifth lenses large.

The condition (4) serves to minimize coma aberration with respect to rays of small height of point of incidence and particularly of angles of incidence greater than 20°; outside this range compensation becomes very difficult to accomplish. The condition (5) functions to optimize the image with respect to rays of angles of incidence between about 15° and 25° and of large height for point of incidence. The conditions (6) and (7) are essential for maintaining a good state of spherical aberration, a distrable compensation being achieved through the use of a suitable value of $r_{12}$, the radius of curvature of the sixth lens rear face and seventh lens front face, and the recited relationship of $n_7$ and $n_6$ the indices of refraction of the seventh and sixth lens respectively. These conditions also serve to make the Petzval sum positive.

The lens system according to the present invention is highly compact, of long back focal length, highly corrected and aviods the drawbacks and disadvantages of conventional wide angle objective lens systems.

BRIEF DESCRIPTION OF THE DRAWINGS

FIG. 1 is a longitudinal sectional view of a lens system embodying the present invention; and FIG. 2 is a set of aberration curves thereof.

DESCRIPTION OF THE PREFERRED EMBODIMENT

Referring now to the drawings which illustrate a preferred embodiment of the present invention and the aberration curves of a specific example thereof the improved lens system comprises nine lenses including:

a first negative meniscus lens L1 having a thickness $t_1$, an index of refraction $n_1$, an Abbe value $V_1$, a first convex front face of radius of curvature $r_1$, and second concave rear face of radius of curvature $r_2$;

a second positive lens L2 spaced from first lens L1 a distance $d_1$ and having a thickness $t_2$, an index of refraction $n_2$, and Abbe value $V_2$, a third convex front face of radius of curvature $r_3$, and a fourth rear face of radius of curvature $r_4$;

a third negative meniscus lens L3 spaced from second lens L2 a distance $d_2$ and having a thickness $t_3$, an index of refraction $n_3$, an Abbe value $V_3$ a fifth convex front face of radius of curvature $r_5$, and a sixth concave rear face of radius of curvature $r_6$;

a fourth lens L4 of greater thickness and smaller power than that of the other lenses of the lens system, spaced a distance $d_3$ from third lens L3 and having a thickness $t_4$, an index of refraction $n_4$, an Abbe value $V_4$, a seventh front face of radius of curvature $r_7$ and an eighth rear face of radius of curvature $r_8$;

a fifth double convex lens L5 spaced from fourth lens L4 a distance $d_4$ and having a thickness $t_5$, an index of refraction $n_5$, an Abbe value $V_5$, a ninth front face of radius of curvature $r_9$ and a tenth rear face of radius of curvature $r_{10}$;

a sixth double convex lens L6 spaced from fifth lens L5 a distance $d_5$ and having a thickness $t_6$, an index of refraction $n_6$, an Abbe value $V_6$, an eleventh front face of radius of curvature $r_1$, and a twelfth rear face of lesser curvature than the eleventh front face and of radius of curvature $r_{12}$;

a seventh double concave lens L7 spaced from sixth lens L6 a zero distance $d_6$, and having a thickness $t_7$, an index of refraction $n_7$, an Abbe value $V_7$, a thirteenth front face of radius of curvature $r_{13}$ equal to $r_{12}$ and complementing and cemented to the lens twelfth face whereby the sixth and seventh lenses form a unitary group, the seventh lens L7 having a fourteenth rear face of radius of curvature $r_{14}$ and of greater curvature than the seventh lens front face;

a positive meniscus eighth lens L8 spaced from seventh lens L7 a distance $d_7$ and having a thickness $t_8$, an index of refraction $n_8$, an Abbe value $V_8$, a concave front fifteenth face of a radius of curvature $r_{15}$ and a convex rear sixteenth face of a radius of curvature $r_{16}$; and a positive ninth lens L9 spaced from eighth lens L8 a distance $d_8$ and having a thickness $t_9$, an index of refraction $n_9$, an Abbe value $V_9$, a front seventeenth face of radius of curvature $r_{17}$ and a rear eighteenth face of radius of curvature $r_{18}$.

The following Table I sets forth the radii of curvature of the lens faces, the lens thicknesses, the spacings between the lenses, the indices of refraction and the Abbe values of the lenses of a specific example of the lens system illustrated in FIG. 1, having a focal length of 100 and an f number of 1:3.5. The lens spacings are axially measured between the confronting faces of adjacent lenses and the lens thicknesses are axially measured. Table II sets forth Seidel's coefficients and their respective sums, it being noted that surface numbers 1 to 11 correspond to lens faces 1 to 11, surface number 12 corresponds to common lens faces 12 and 13 and surface numbers 13 to 17 correspond to lens faces 14 to 18, respectively.

TABLE I

| Lens | | | |
|---|---|---|---|
| L1 | $r_1=22.1.0$ | $t_1=10.0$ | $n_1=1.51633$ |
| | $r_2=109.6$ | | $V_1=64.1$ |
| | | $d_1=24.0$ | |
| L2 | $r_3=228.0$ | $t_2=23.5$ | $n_2=1.83630$ |
| | $r_4=2,495.6$ | | $V_2=30.4$ |
| | | $d_2=0.5$ | |
| L3 | $r_5=133.5$ | $t_3=7.5$ | $n_3=1.62041$ |
| | $r_6=43.6$ | | $V_3=60.3$ |
| | | $d_3=35.0$ | |
| L4 | $r_7=-110.0$ | $t_4=35.0$ | $n_4=1.51633$ |
| | $r_8=-138.1$ | | $V_4=64.1$ |
| | | $d_4=0.5$ | |
| L5 | $r_9=179.0$ | $t_5=20.0$ | $n_5=1.55690$ |
| | $r_{10}=-247.9$ | | $V_5=48.5$ |
| | | $d_5=5.0$ | |
| L6 | $r_{11}=68.5$ | $t_6=22.0$ | $n_6=1.56883$ |
| | $r_{12}=-116.0$ | | $V_6=56.0$ |
| | | $d_6=0$ | |
| L7 | $r_{13}=-116.0$ | $t_7=4.5$ | $n_7=1.69895$ |
| | $r_{14}=63.1$ | | $V_7=30.0$ |
| | | $d_7=11.0$ | |
| L8 | $r_{15}=-124.5$ | $t_8=10.0$ | $n_8=1.58487$ |
| | $r_{16}=-73.4$ | | $V_8=53.0$ |
| | | $d_8=0.5$ | |
| L9 | $r_{17}=\infty$ | $t_9=9.5$ | $n_9=1.56732$ |
| | $r_{18}=-106.4$ | | $V_9=42.8$ |

TABLE II.—SEIDEL'S COEFFICIENTS

| Surface No.: | $S_1$ | $S_2$ | $S_3$ | $S_4$ | $S_5$ |
|---|---|---|---|---|---|
| 1 | 0.02 | 0.02 | 0.03 | 0.15 | 0.24 |
| 2 | −0.41 | −0.01 | −0.00 | −0.31 | −0.01 |
| 3 | 0.13 | 0.10 | 0.08 | 0.19 | 0.21 |
| 4 | 0.00 | −0.00 | 0.07 | −0.01 | −0.77 |
| 5 | 0.04 | 0.04 | 0.04 | 0.28 | 0.34 |
| 6 | −9.93 | 1.26 | −0.16 | −0.87 | 0.13 |
| 7 | 0.03 | −0.07 | 0.18 | −0.30 | 0.30 |
| 8 | −0.03 | 0.07 | −0.13 | 0.24 | −0.20 |
| 9 | 3.28 | 0.97 | 0.29 | 0.19 | 0.14 |
| 10 | 0.15 | −0.13 | 0.11 | 0.14 | −0.22 |
| 11 | 4.83 | 1.26 | 0.32 | 0.52 | 0.22 |
| 12 or 13 | −2.34 | 0.33 | −0.04 | −0.04 | 0.01 |
| 14 | −6.93 | −2.43 | −0.85 | −0.65 | −0.52 |
| 15 | −0.08 | 0.06 | −0.04 | −0.29 | 0.22 |
| 16 | 4.61 | −0.62 | 0.08 | 0.49 | −0.07 |
| 17 | −0.00 | 0.02 | 0.07 | 0.00 | 0.22 |
| 18 | 8.00 | −0.72 | 0.06 | 0.34 | −0.03 |
| Sum | 1.37 | 0.16 | −0.00 | 0.09 | 0.20 |

The above data indicate values with the diaphragm placed at 4 behind the tenth surface.

The aberration curves illustrated in FIG. 2 are those of the specific example given above in which (a) represents by solid line the spherical aberration and by broken line the sine condition, (b) represents chromatic difference of spherical aberration, (c) represents distortion aberration, and (d) represents astigmatism in which the solid line corresponds to the sagittal image plane and the broken line the meridional image plane. The curves are shown with reference to the $d$-line except that for chromatic difference where the $g$-line curve is shown by broken line. An inspection of the aberration curves illustrates the high degree of correction which is achieved with the present improved long back focus wide angle lens system.

While there has been described and illustrated a preferred embodiment of the present invention, it is apparent that numerous alterations, omissions, and additions may be made without departing from the spirit thereof.

What is claimed is:
1. A lens system comprising nine lenses herein successively designated as 1 to 9 with lens faces herein successively designed as 1 to 18, and having a focal length of 100 and possessing the following dimensions and relationships:

TABLE I

| Lens | | | |
|---|---|---|---|
| $L_1$ | $r_1=221.0$ | $t_1=10.0$ | $n_1=1.51633$ |
| | $r_2=109.6$ | | $V_1=64.1$ |
| | | $d_1=24.0$ | |
| $L_2$ | $r_3=228.0$ | $t_2=23.5$ | $n_2=1.83630$ |
| | $r_4=2,495.6$ | | $V_2=30.4$ |
| | | $d_2=0.5$ | |
| $L_3$ | $r_5=133.5$ | $t_3=7.5$ | $n_3=1.62041$ |
| | $r_6=43.6$ | | $V_3=60.3$ |
| | | $d_3=35.0$ | |
| $L_4$ | $r_7=-110.0$ | $t_4=35.0$ | $n_4=1.51633$ |
| | $r_8=-138.1$ | | $V_4=64.1$ |
| | | $d_4=0.5$ | |
| $L_5$ | $r_9=179.0$ | $t_5=20.0$ | $n_5=1.55690$ |
| | $r_{10}=-247.9$ | | $V_5=48.5$ |
| | | $d_5=5.0$ | |
| $L_6$ | $r_{11}=68.5$ | $t_6=22.0$ | $n_6=1.56883$ |
| | $r_{12}=-116.0$ | | $V_6=56.0$ |
| | | $d_6=0$ | |
| $L_7$ | $r_{13}=-116.0$ | $t_7=4.5$ | $n_7=1.69895$ |
| | $r_{14}=63.1$ | | $V_7=30.0$ |
| | | $d_7=11.0$ | |
| $L_8$ | $r_{15}=-124.5$ | $t_8=10.0$ | $n_8=1.58487$ |
| | $r_{16}=-73.4$ | | $V_8=53.0$ |
| | | $d_8=0.5$ | |
| $L_9$ | $r_{17}=\infty$ | $t_9=9.5$ | $n_9=1.56732$ |
| | $r_{18}=-106.4$ | | $V_9=42.8$ | wherein $r_j$ is the radius of curvature of the $j$-th lens face; $t_i$ is the axial thickness of the $i$-th lens; $d_i$ is the axial distance between the rear face of the $i$-th lens and the next successive lens face; $n_i$ is the index of refraction of the $i$-th lens; and $V_i$ is the Abbe value of the $i$-th lens.

References Cited

UNITED STATES PATENTS 3,033,082  5/1962  Merigold _____ 350—214
3,044,356  7/1962  Cox et al. _____ 350—214X
3,132,199  5/1964  Zimmermann et al. ___ 350—214

DAVID SCHONBERG, Primary Examiner

P. A. SACHER, Assistant Examiner

U.S. Cl. X.R.

350—176